Oct. 10, 1933.  H. A. WILSON  1,929,667
INDICATING DEVICE
Filed April 2, 1932

INVENTOR:
Howard A. Wilson,
by R. Goldsborough
HIS ATTORNEY.

Patented Oct. 10, 1933

1,929,667

UNITED STATES PATENT OFFICE 1,929,667

INDICATING DEVICE

Howard A. Wilson, Merchantville, N. J., assignor to Radio Corporation of America, a corporation of Delaware Application April 2, 1932. Serial No. 602,687

8 Claims. (Cl. 116—124.4)

My invention relates to indicating devices and, more particularly, to devices of the type used for indicating the adjustment of variable tuning elements in radio receivers.

Indicating devices of the general type to which my invention pertains may be roughly divided into two classes, namely those wherein a scale element carrying indicia is illuminated from the rear, and those wherein the indicia carrying element is opaque and is illuminated from the front.

Devices of the first referred to type are, in general, the most satisfactory. Some difficulty has been found, however, in providing a material sufficiently rigid to not warp in use and, at the same time, sufficiently translucent to permit enough light to pass through it to give a satisfactory indication. Such material as has heretofore been used, either paper, celluloid, or the like, does not lend itself readily to manufacturing operations and, furthermore, the inevitable inequalities of the material itself have caused the dial scales to be somewhat unevenly illuminated.

It is, accordingly, an object of my invention to provide an indicating device which, although it includes an opaque indicia carrying element, conveys to the observer the illusion that the said element is translucent and is illuminated from the rear.

In practicing my invention, I make use of a well-known optical phenomenon. That is, I interpose between the eye of the observer and an opaque, indicia carrying element or dial-scale a color screen which is colored to match the background color of said element. The screen, therefore, so modifies the light reflected from the dial scale that an illusion of transparency is had.

Figure 1:
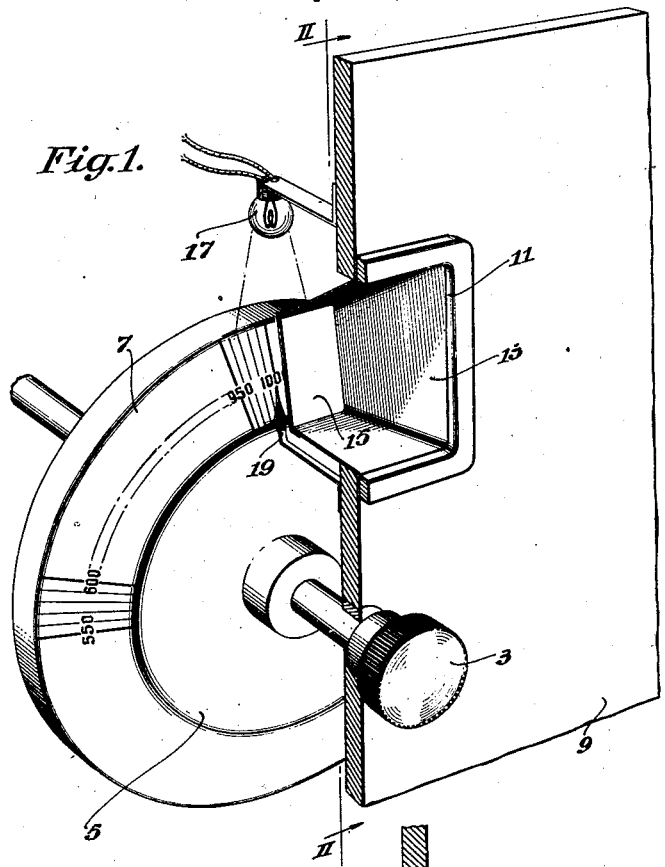
Figure 2:
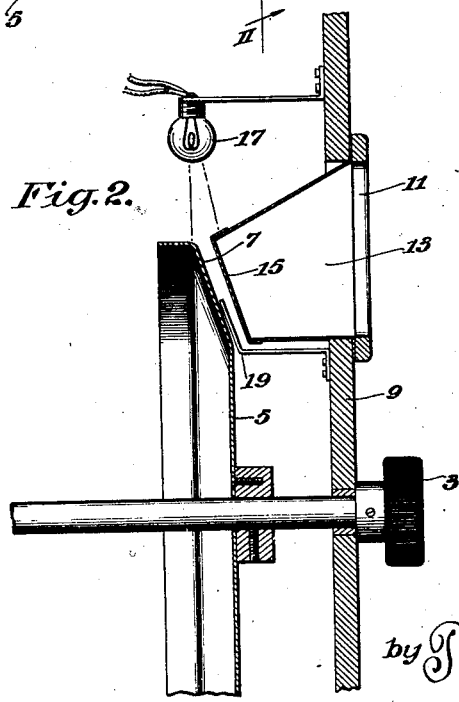

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which Fig. 1 is a view in perspective of an indicating device including a preferred embodiment of my invention, a portion of the supporting panel being broken away, and Fig. 2 is a cross-sectional view, in elevation, of the device, taken along a line corresponding to the line II—II in Fig. 1.

Referring to the drawing, an indicating device constructed according to my invention includes a shaft provided with an adjusting knob 3 to which a variable tuning element, such as a condenser or a variometer (not shown) is affixed. The shaft carries a circular element 5 having a periphery beveled to provide a readily visible lead 7 on which is printed or otherwise marked a plurality of radial lines and figures corresponding to various adjustments of the variable element.

The dial scale 7 is disposed rearwardly of a panel 9 provided with an escutcheon opening 11. Interiorly of the escutcheon opening is disposed a pyramidal opaque shield 13 on the inner end of which is mounted a translucent color screen 15. I have found thin celluloid to be a particularly good material of which to make the screen, although other material, such as glass, may be used.

A light source 17 is so disposed with respect to the dial scale that the front surface thereof visible to the observer is illuminated. A pointer 19 or a similar fiduciary element is provided it, of course, being understood that the pointer may be carried by or printed upon the color screen itself, if desirable.

In the operation of my improved adjusting device, it is obvious that the dial scale partakes of the rotation of the variable tuning element and that the figures corresponding to momentary adjustments are indicated by the fiduciary mark.

Light reflected from the dial scale reaches the eye of the observer only after it is passed through the color screen. If the background of the dial scale on which the figures are printed is colored, and if the color screen is substantially the same color as the said background, the light thus reaching the eye of the observer is filtered. In other words, there is no sensation of color insofar as the dial scale itself is concerned, and the figures stand out somewhat in relief just as though the scale were illuminated from the rear instead of being opaque and being illuminated from the front.

It will, accordingly, be apparent from a consideration of the foregoing that my improved indicating device has many advantages. The dial scale, since it no longer need be translucent, may be constructed of metal or of any other durable material which does not tend to warp when in use. Furthermore, the illusion of transparency conveyed to the eye of the observer is pleasing and the device may be observed for quite long intervals without inducing fatigue of the optic nerve.

Although I have illustrated and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, a colored dial scale, a color screen matching the color of the scale supported adjacent thereto, means for rendering at least a portion of the surface of the dial scale visible through said color screen, and means for illuminating said surface of the dial scale.

2. In combination, a colored dial scale, means for illuminating one surface of said scale and a color screen matching the color of the scale supported adjacent the illuminated surface.

3. In combination, a substantially opaque element having indicia on a surface thereof, means for illuminating said surface and a color screen supported adjacent said surface.

4. In an indicating device, a substantially opaque element having indicia on a surface thereof, means for illuminating said surface, and a translucent color screen supported adjacent to said illuminated surface, the screen and element being substantially the same color whereby, to the eye of an observer, it appears that the said element is translucent and is illuminated from the rear.

5. In an indicating device, the combination of a movable element having an opaque indicia carrying surface, a translucent color screen, and means for illuminating said surface whereby it may be viewed through said screen.

6. In an indicating device of the class described, a movable opaque indicia carrying element providing a dial, means for renderng a portion of said dial visible including a translucent screen through which the dial may be viewed, and means for illuminating said portion of the dial.

7. An indicating device including in combination, means providing a movable opaque dial scale, means for rendering a portion of said dial scale visible, including a translucent color screen through which said scale may be viewed, said translucent screen and the surface of said dial scale being substantially of the same color, and means for illuminating said scale whereby the illusion of transparency thereof is conveyed to the eye of an observer.

8. An indicating device including in combination, a circular rotary element having an opaque peripheral indicia carrying surface, means for illuminating a portion of said surface, shield means through which said portion of the indicia carrying surface may be viewed to the exclusion of the illuminating means, and a translucent screen associated with the indicia carrying surface and interposed between said surface and the shield means for imparting to said surface when illuminated the illusion of transparency.

HOWARD A. WILSON.